Sept. 13, 1938.  R. H. BECKMAN ET AL  2,129,807
WHEEL STRUCTURE
Filed Dec. 23, 1935  2 Sheets-Sheet 1

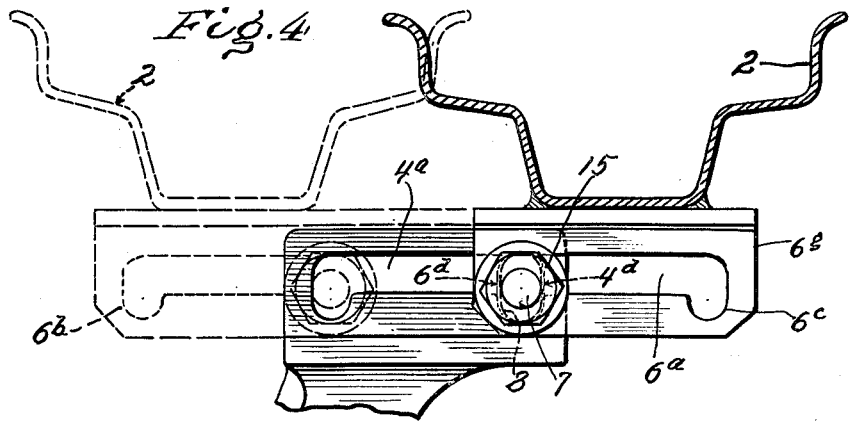
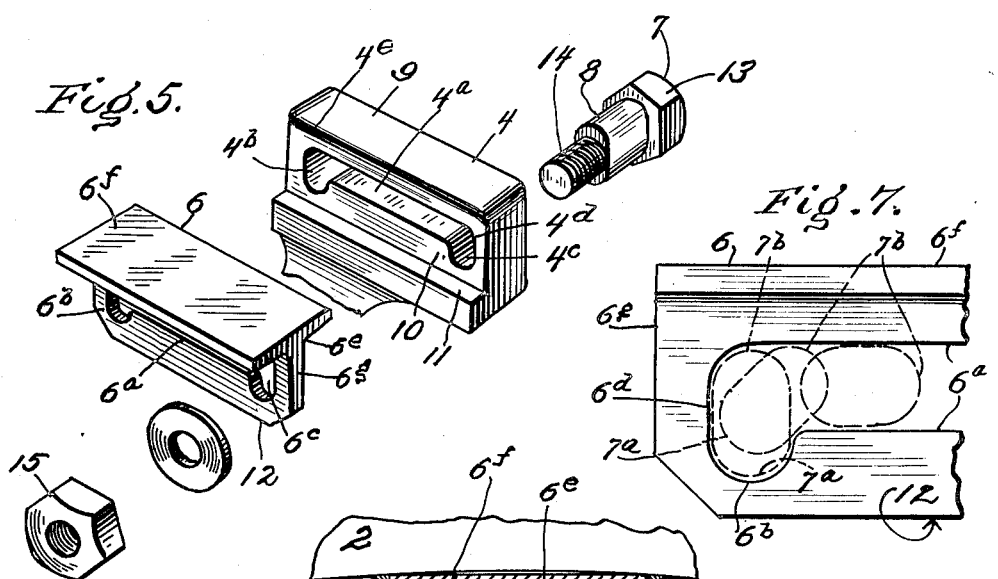
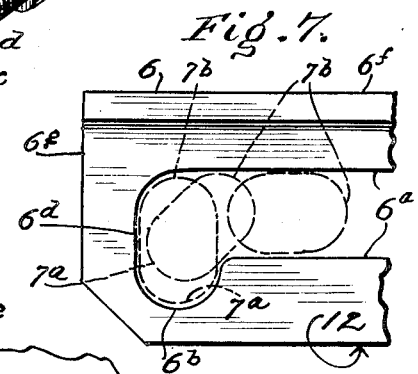
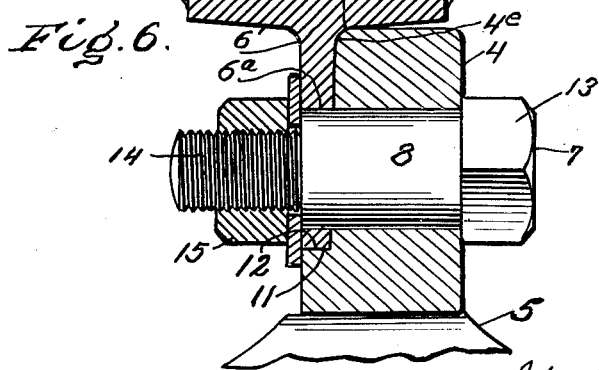

Patented Sept. 13, 1938

2,129,807

UNITED STATES PATENT OFFICE 2,129,807

WHEEL STRUCTURE

Rudolph H. Beckman, Davenport, and John H. Ploehn, Bettendorf, Iowa, assignors to French & Hecht, Incorporated, a corporation of Iowa Application December 23, 1935, Serial No. 55,780

9 Claims. (Cl. 301—12)

This invention relates to wheel structures and particularly to wheels for vehicles whose use requires or makes it desirable that the track of the wheels, that is the lateral distance between them, may be varied. The class of vehicles to which the invention is mainly directed is that including tractors and farm machinery, where, either because of the character of the landscape or because of the varying manner in which different kinds of vegetation are planted, it would be impossible to adapt a tractor or other farm machinery for many uses if it were not possible to vary the track of the wheels.

The prior art to which the present invention relates suggests different features of wheel construction and mounting whereby the lateral track of the wheels of a vehicle may be varied, such, for example, as the provision of an elongated axle on which the wheel can be secured in different axial positions, a wheel structure wherein the tread center lies to one side of a transverse plane passing through the center of the hub so that reversal of the wheel on the axle causes its tread to be closer to or farther from the opposite wheel tread, or a wheel structure in which the tread or rim is movable axially to different positions relatively to the hub. In some instances, too, it has been proposed to combine the features mentioned to afford a variation of the track of the wheels greater than that which is obtainable by one of the aforesaid features alone.

It is one object of the present invention to provide in a wheel structure of the character referred to improved means for adjusting the wheel tread or rim axially relatively to the hub.

Another object of the invention is the provision of improved means for adjustably securing the wheel rim to the intermediate connecting means between the rim and hub.

Still another object of the invention is to provide means for attaching the wheel rim to the intermediate connecting means between the rim and hub which permits axial adjustment of the rim without requiring its disconnection or removal therefrom.

Further objects are the provision of a wheel structure which is easy and economical to manufacture, whose rim may be quickly and easily adjusted axially of the wheel to different set positions and means for securely fastening the rim in any set position. Other objects will be apparent from the detailed description which follows.

In its broader aspects, the invention contemplates a wheel structure comprising a hub and a rim secured together by intermediate connecting means, and attaching means for securing the rim to the intermediate connecting means in different axial positions relatively thereto and to the hub, the attaching means being formed so that the rim may be slidably moved to locate it in the desired position without completely detaching or removing it from the intermediate connecting means, and means for securely fastening the rim in different adjusted positions.

In the accompanying drawings, the invention has been shown merely by way of example and in preferred form, and obviously many variations and modifications may be made therein which will still be comprised within its spirit. It is to be understood, therefore, that the invention is not limited to any specific form or embodiment except insofar as such limitations are specified in the appended claims.

Referring to the drawings:

Fig. 4 is a fragmentary elevational view, partly in section, showing by the full and dotted lines the rim in its extreme right and left-hand positions, respectively;

Fig. 5 is a perspective view of the rim attaching assembly in disassembled condition;

Fig. 6 is a cross-sectional elevation of the parts shown in Fig. 5, showing them in assembled condition; and Fig. 7 is a diagrammatic illustration of the rotation of the fastening bolt to accommodate itself to different regions of the slots in the attaching members.

Figure 1:
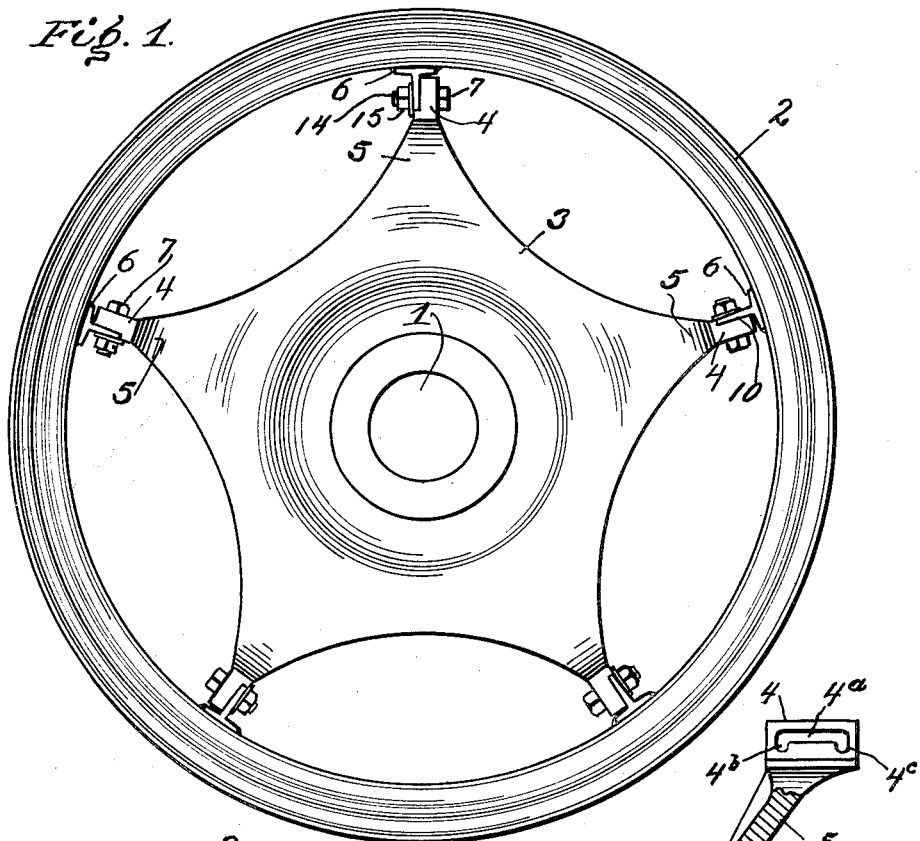
Fig. 1 is a side elevation of the improved wheel.
Figure 2:
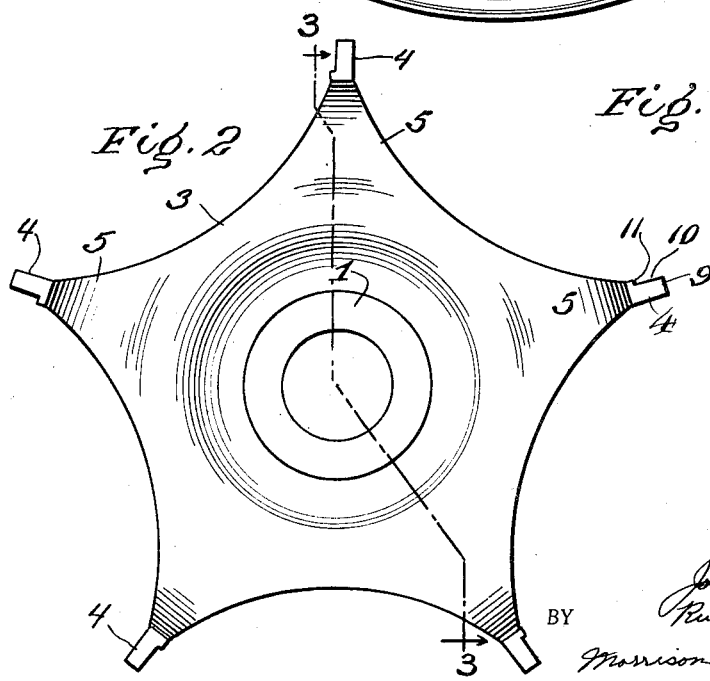
Fig. 2 is a side elevation of the wheel with the rim removed.
Figure 3:
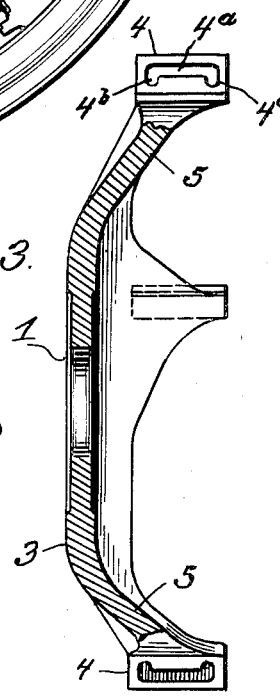
Fig. 3 is a sectional view taken on the line 3—3 of Fig. 2.

In the preferred embodiment of the invention shown in the drawings, the wheel comprises a hub 1 and a rim 2 connected together by a star-shaped disk 3. Attaching members 4 are formed on radiants 5 of the disk 3 and the radially inner surface of the rim is equipped with complementary T-shaped attaching members 6. The attaching members 4 and 6 extend axially of the rim 2 and disk 3 and are formed with parallel walled slots 4ª and 6ª, respectively, which are adapted to align to receive fastening bolts 7 by which the members are clamped together in facewise engagement. The slots 4ª and 6ª extend lengthwise of the members 4 and 6 and are widened at opposite ends to form enlarged apertures 4ᵇ, 4ᶜ and 6ᵇ, 6ᶜ in the respective members, and the alignment of an aperture in one member with an aperture in the complementary member determines a set position in which to locate and fasten the rim 2. The fastening bolts 7 are formed with shanks 8 which are non-circular in cross-section, having two different cross-sectional dimensions, so that when the bolts 7 occupy one position they can pass freely through the slots 4ᵃ, 6ᵃ as the rim is shifted from one position to another but when rotated to another position, in the apertures at the ends of the slots, they serve as keys to prevent accidental shifting of the rim 2 and maintain it in its adjusted or set position.

The attaching members 4 formed on the radiants 5 of the disk 3 are in the form of upstanding rectangular lugs which extend axially of the disk and are equidistant from the axis of the wheel. Corresponding side faces of the members 4 are cut away for a predetermined distance inwardly from the radially outer surfaces 9 of the members 4, thus providing recesses 10 to accommodate the complementary attaching members 6 on the rim 2 and also providing supporting ledges 11 against which radially inner edges 12 of the members 6 abut and relieve the bolts 7 of the shearing action to which otherwise they would be subjected. Additional support for the members 6 is obtained by their engagement with the corners 4ᵉ of the radially outer ends of the lugs 4, which are rounded to fit snugly into the angles of jointure 6ᵉ formed by the heads 6ᶠ and shanks 6ᵍ of the members 6, see Fig. 6. The attaching members 4 and 6 may be of any desired length within practical limits and the aligning slots 4ᵃ and 6ᵃ extend throughout the greater part of the length of their respective members. The apertures 4ᵇ, 4ᶜ and 6ᵇ, 6ᶜ are formed by cutting away the radially inner parallel walls defining the slots 4ᵃ and 6ᵃ to an equal extent in all attaching members 4 and 6, so that in complementary members they match perfectly when aligned. It is also to be noted that structurally all of the members 4 are uniform and all of the members 6 are uniform, so that any member 6 on the rim 2 can cooperate with any member 4 on the disk 3.

The bolts 7 are formed with hexagonal heads 13, threaded ends 14 to receive nuts 15 and intermediate shanks 8, which, as already stated, are non-circular in cross-section (see Figs. 5 and 7), being shown in the drawings as having flat sides and rounded ends. It is pointed out, however, that the bolt shanks 8 can be of any desired shape as long as one cross-sectional dimension is less than the distance between the parallel walls defining the slots 4ᵃ and 6ᵃ and another cross-sectional dimension is greater than the distance between said parallel walls but less than the depth of the apertures 4ᵇ, 4ᶜ and 6ᵇ, 6ᶜ. Thus the bolts 7 are adapted both to clamp the attaching members 4 and 6 together face-wise in set position and to key them against relative axial movement, yet by merely loosening the nuts 15 the bolts can be moved through the slots when rotated to one position (see Fig. 7) and lock the rim in its adjusted position when given a one-quarter turn and located in aligned apertures at the ends of the slots. With this arrangement, the rim may be adjusted from one set position to another without being removed or completely detached.

A feature of the improved means for attaching the rim 2 to the disk 3 is that in the event that the attaching members 4 and 6 stick together from having been in one set position for a long period of time or for some other reason, rotation of the bolts 7 to enter the slots 4ᵃ and 6ᵃ will loosen the members 4 and 6 and, hence, injury to the parts as by hammering them is avoided. Referring to Fig. 4, when the rim 2 is in its full line position the shanks 8 of the bolts 7 are confined snugly between walls 4ᵈ and 6ᵈ of the apertures 4ᶜ and 6ᵇ, respectively. Therefore, in order for the bolts 7 to be rotated to enter the slots 4ᵃ and 6ᵃ the attaching member 6 must move slightly to the left. It will be apparent, then, that in rotating the bolts 7 their shanks 8 will act as cams and, bearing against the walls 4ᵈ of the fixed members 4, will force the members 6 and consequently the rim 2 toward the left. The same is true, of course, when the rim 2 occupies the position shown by the dotted lines in Fig. 4.

Another feature to be noted resides in the fact that the rim may be shifted from one position to another without manually guiding the bolts 7 into the slots 4ᵃ and 6ᵃ as the shift is effected. When the nuts 15 on the bolts 7 are loosened, by giving the bolts a one-quarter turn one end, the end 7ᵃ for example, Fig. 7, is cammed against the end wall 6ᵈ of the member 6 and the opposite end 7ᵇ is entered and held in the slots 4ᵃ and 6ᵃ. Hence, the bolts can be successively rotated to enter the slots and the rim thereafter shifted without giving them further attention.

The shifting of the rim is effected as follows: Assuming the rim is located in the full line position in Fig. 4, that is, its extreme right-hand position with the apertures 4ᶜ and 6ᵇ in the attaching members 4 and 6, respectively, aligned and the bolts 7 located therein and tightened to clamp the attaching members together. Successively the nuts 15 are loosened and the bolts 7 then successively given a one-quarter turn counter-clockwise to enter them in the slots 4ᵃ and 6ᵃ. When all of the bolts 7 have been acted upon in this manner, the rim is free to be shifted to the left, say to the extreme left-hand position shown by the dotted lines, the attaching members 6 moving relatively to the members 4 and the bolts being carried along therewith. In this position the apertures 4ᵇ and 6ᶜ in the members 4 and 6, respectively, are adapted to align and the bolts 7 are given successively a one-quarter rotation in the same direction as before to seat them in the apertures. This rotation of the bolts 7 accurately aligns the apertures 4ᵇ and 6ᶜ and properly locates the rim 2. The nuts 15 are then tightened to clamp the attaching members 4 and 6 securely together facewise. It is pointed out that the rim 2 has a third or central position with the apertures 4ᵇ, 6ᵇ and 4ᶜ, 6ᶜ respectively aligned; and the bolts 7 may be located in either series of aligned apertures or staggered in successive pairs of attaching members 4 and 6. It will be understood, of course, that when it is desired to remove the rim 2 from the disk 3, the bolts 7 need only be completely removed and the attaching members 4 and 6 are free to be separated by sliding the rim laterally or rotating it (counter-clockwise in Fig. 1) to break their engagement.

While in its preferred embodiment the wheel structure has been shown as comprising a disk to connect the hub and rim, it is to be understood that the attaching members 4 could be formed equally well on the ends of spokes. Moreover, the form of attaching means for securing the rim to the disk or spokes could be varied and yet permit a sliding adjustment of the rim axially relatively to the hub without departing from the spirit of the invention. As already pointed out, the bolts 7 not only serve to clamp the attaching members together in facewise engagement but act as keys to lock the rim in its adjusted position, and for this latter purpose their shanks could be of a variety of forms. It is pointed out further that the number of enlarged apertures for determining the set positions of the rim and accommodating the bolts could be increased if desired to permit adjustment of the rim to a greater number of positions. Therefore, in its broader aspects, the invention is not limited to the specific embodiment shown and described.

Having thus described our invention what we claim is:

1. In a wheel structure, the combination of a rim, a wheel body, a plurality of attaching members arranged on the wheel body in spaced relation circumferentially thereof for securing the rim to the wheel body, said attaching members being formed so that the rim may be slidably moved relatively thereto to locate it in different axial positions on the wheel body, attaching members correspondingly arranged on the rim, and fastening means cooperative with the attaching members independently of the rim for securing the attaching members together.

2. In a wheel structure, the combination of a rim, a wheel body, a plurality of attaching members arranged on the wheel body in spaced relation circumferentially thereof for securing the rim to the wheel body in different set positions axially thereof, said attaching members being formed so that the rim may be slidably moved relatively thereto to locate it in any one of said set positions, attaching members correspondingly arranged on the rim, and fastening means cooperative with the attaching members independently of the rim for securing the attaching members on the rim to those on the wheel body in any set position of the rim.

3. In a wheel structure, the combination of a rim, a wheel body, a plurality of attaching members arranged on the wheel body in spaced relation circumferentially thereof for securing the rim to the wheel body, said attaching members being formed so that the rim may be slidably moved relatively thereto to locate it in different posiltons axially relatively to the wheel body, attaching members correspondingly arranged on the rim for cooperation with the attaching members on the wheel body in the different axial positions of the rim, and means for fastening the attaching members on the rim and wheel body together, the attaching members and fastening means being constructed and arranged so that the attaching members are movable relatively to one another and to the fastening means in locating the rim in its different positions.

4. A wheel structure as in claim 1, wherein the attaching members are formed with apertures adapted to register when the members occupy different axial positions relatively to one another, and wherein the attaching members are fastened together by bolts passing through the apertures.

5. A wheel structure as in claim 1, wherein the attaching members extend transversely of the wheel body and are formed with axially extending slots defined by parallel walls and adapted to align, said walls being cut away at predetermined points to form enlarged apertures adapted to register when the attaching members occupy different axial positions relatively to one another, and wherein the means fastening the attaching members together are bolts adapted to pass through the openings formed when said apertures register.

6. A wheel structure as in claim 2, wherein the fastening means is removable to permit detachment of the rim from the intermediate connecting means, and wherein the attaching members and fastening means are formed so that the rim may be moved from one set position to another when the fastening means is loosened but not removed.

7. A wheel structure as in claim 2, wherein the attaching members extend transversely of the wheel body and are formed each with a slot extending axially thereof and defined by parallel walls one of which is cut away at each end thereof to form an enlarged aperture, the location of an aperture in one attaching member in register with an aperture in the attaching member cooperative therewith determining a set position in which to fasten the members together.

8. A wheel structure as in claim 2, wherein the attaching members extend transversely of the wheel body and are formed each with a slot extending axially thereof and defined by parallel walls one of which is cut away at each end thereof to form an enlarged aperture, the location of an aperture in one attaching member in register with an aperture in the attaching member cooperative therewith determining a set position in which to fasten the members together, and wherein the fastening means comprises bolts having shanks non-circular in cross-section and adapted to fit in said slots when occupying one position and to fit in said apertures when rotated to a different position.

9. A wheel structure as in claim 2, wherein the attaching members extend transversely of the wheel body and are formed each with a slot extending axially thereof and defined by parallel walls one of which is cut away at each end thereof to form enlarged apertures, the location of an aperture in one attaching member in register with an aperture in the attaching member cooperative therewith determining a set position in which to fasten the members together, and wherein the fastening means is adapted to fit in said apertures and comprises a bolt having a shank non-circular in cross-section and having one cross-sectional dimension less than the width of the slots and another cross-sectional dimension greater than the width of the slots.

RUDOLPH H. BECKMAN.
JOHN H. PLOEHN.